United States Patent [19]

Oshima

[11] Patent Number: 4,860,994
[45] Date of Patent: Aug. 29, 1989

[54] SEAL SYSTEM FOR BUTTERFLY VALVE

[76] Inventor: Akira Oshima, No. 136, Idogayanakamchi, Minami-ku, Yokohama-City, Japan

[21] Appl. No.: 318,497

[22] Filed: Mar. 2, 1989

Related U.S. Application Data

[63] Continuation of Ser. No. 139,008, Dec. 29, 1987, abandoned.

[30] Foreign Application Priority Data

Jun. 29, 1987 [JP] Japan .................................. 62-161812

[51] Int. Cl.$^4$ ................................................ F16K 1/22
[52] U.S. Cl. ...................................... 251/173; 251/180
[58] Field of Search ............... 251/173, 174, 180, 305, 251/306, 307

[56] References Cited

U.S. PATENT DOCUMENTS

| | | | |
|---|---|---|---|
| 2,058,996 | 10/1936 | Kollberg | 251/306 |
| 3,166,291 | 1/1965 | Grove | 251/174 X |
| 3,275,289 | 9/1966 | Fawkes | 251/306 |
| 3,282,558 | 11/1966 | Swain | 251/306 X |
| 4,483,511 | 11/1984 | Kushida et al. | 251/174 |
| 4,632,360 | 12/1986 | De Salve | 251/307 X |

FOREIGN PATENT DOCUMENTS

| | | | |
|---|---|---|---|
| 966554 | 8/1957 | Fed. Rep. of Germany | 251/307 |
| 2033054 | 5/1980 | United Kingdom | 251/173 |

*Primary Examiner*—John Fox
*Attorney, Agent, or Firm*—Kane, Dalsimer, Sullivan, Kurucz, Levy, Eisele and Richard

[57] ABSTRACT

A seal system for butterfly valves of concentric- or eccentric valve body closure, which comprises a circumferential receptacle groove formed around the circumference of the valve body; a seal metal extending over the circumference of the valve body and having curved outer ridge face, arranged inserted in said receptacle groove on the circumference of valve body so as to permit its radial displacement; a stripe of seat metal suitable for receiving said curved outer face of said seal metal upon closure of the butterfly valve to effect a fluid tight seal, said seat metal protruding from the casing inner face with its front face inclining relative to the axis of the valve casing to permit a tight fit thereof with said outer ridge of said seal metal, wherein a buffer ring having a sectional form permitting a resilient deformation, such as a C-shape, is inserted in said circumferential receptacle groove of valve body between the groove bottom and said seal metal in order to effect a resilient support of said seal metal.

1 Claim, 3 Drawing Sheets

SEAL SYSTEM FOR BUTTERFLY VALVE

This is a continuation of co-pending application Ser. No. 139,008 filed on Dec. 29, 1987, now abandoned.

BACKGROUND OF THE INVENTION

1. Field of the Invention

The present invention relates to a seal system for butterfly valve and, in particular, to a seal system in which the tightness between the outer periphery of the valve body and the internal closure face of the valve casing upon closure of the valve is improved.

2. Description of the Prior Art

Heretofore, butterfly valves are utilized mainly for portions where control of flow rate is required, due to their easiness in restricting fluid flow. Thus, a fluid tightness upon closure of butterfly valve has been of a rather minor importance. Therefore, the fluid tightness of butterfly valve upon closure thereof is realized only by a press contact of outer rim of the valve body onto the seat metal on the inner surface of the valve casing.

The seal mechanism by a mere press contact had shown insufficient seal effect, as the valve would have often suffered from leakage after a prolonged service due to incidental excessive or abrupt change in the hydrostatic pressure, erosion and so on, what have resulted in extraneous expenses in the maintenance costs and repair works etc.

SUMMARY OF THE INVENTION

The object of the present invention is to provide an improved seal system for butterfly valve in which the above-mentioned defect is removed and superior fluid tightness upon closure of the butterfly valve is realized.

It has now been discovered that the above object can be attained according to the present invention by a seal system for butterfly valves of concentric- or eccentric valve body closure, which comprises a circumferential receptacle groove formed around the circumference of the valve body; a seal metal extending over the circumference of the valve body and having curved outer ridge face, arranged inserted in said receptacle groove on the circumference of valve body so as to permit its radial displacement; a stripe of seat metal suitable for receiving said curved outer face of said seal metal upon closure of the butterfly valve to effect a fluid tight seal, said seat metal protruding from the casing inner face with its front face inclining relative to the axis of the valve casing to permit a tight fit thereof with said outer ridge of said seal metal, wherein a buffer ring having a sectional form permitting a resilient deformation is inserted in said circumferential receptacle groove of valve body between the groove bottom and said seal metal in order to effect a resilient support of said seal metal.

The buffer ring may preferably be in a form of an axially split tube of a C-shaped section, which is disposed in the receptacle groove with its axial split being directed to the side wall of the groove to facilitate radial displacement of the seal metal by the springy yielding of the C-sectioned buffer ring. On requirement in accordance with the size of the butterfly valve to be manufactured, the C-sectioned buffer ring may contain in its inside space a reinforcement resilient support member of, such as, a steel plate or the like, to supplement the compression strength of the buffer ring. The C-sectioned buffer ring has a resilient yieldability in the direction lateral to its axial split and, in addition, will being about a strong spreading force when the transport medium, such as water, intrudes, especially at high pressure, into the inside space of the buffer ring, whereby the curved ridge of the seal metal held supported thereon will be pressed onto the slant front face of the seat metal. Thus, a spontaneous adjustment of the seal point between the slant front face of the seat metal and the curved top of the seal metal will be attained by sliding on the slant face, what may be the cause of real attainment of the high fluid tightness upon closure of the valve.

DETAILED DESCRIPTION OF PREFERRED EMBODIMENTS

Below, the present invention will further be described in detail with reference to the Drawings appended.

Figure 1:
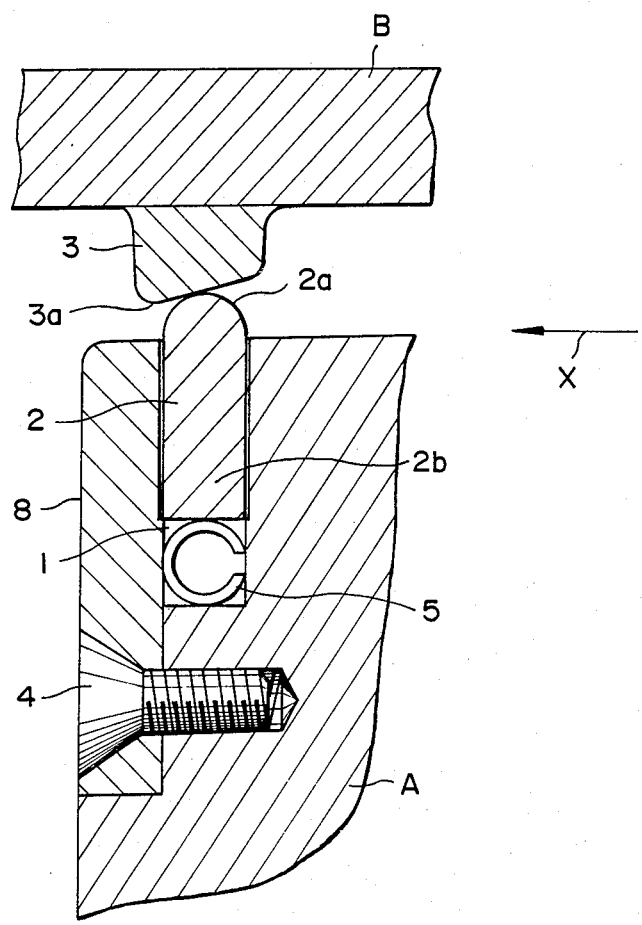
FIG. 1 shows an essential part of one embodiment of the seal system according to the present invention in a sectional view.
Figure 2:
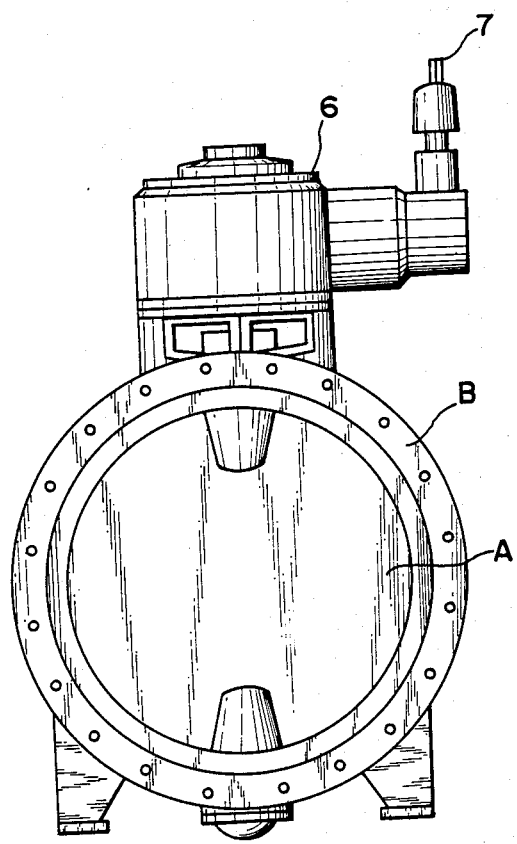
FIG. 2 is a front view of a butterfly valve in which the seal system according to the present invention is to be incorporated.
Figure 3:
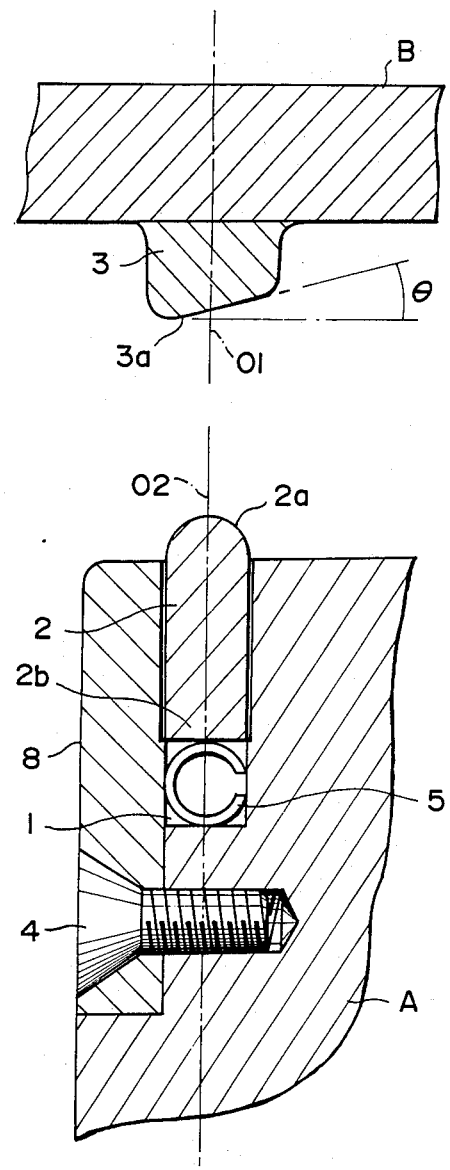
FIG. 3 is an explanatory drawing for the construction of the seal system as shown in FIG. 1.

In FIG. 1, an essential part of one embodiment of the seal system according to the present invention is shown in a sectional view. Such a seal system can be incorporated in a butterfly valve as shown in FIG. 2, in which a butterfly valve body A is arranged in a round valve casing B rotatably around a support shaft operated by a valve opening shaft 7 disposed outside the operation box 6. Around the inner surface of the valve casing B, a stripe of seat metal 3 of a definite width suitable for receiving the peripheral edge of the valve body upon closure of the valve and having a front face 3a slanting at an angle of $\theta$ (FIG. 3) to the axis of the valve casing is provided bodily with the casing B. On the peripheral adge of the valve body A, there is provided a seal metal 2 having a curved outer ridge face 2a under insertion into a receptacle groove 1 formed over the circumference of the valve body A. The groove 1 is formed by screwing (4) a fitting plate 8 on a stage face around the edge portion of the valve body so as to leave a space for the groove 1. The seal metal 2 inserted in the circumferential receptacle groove 1 is supported on a buffer ring 5 disposed in the groove 1 between the groove bottom and the seal metal 2. The buffer ring 5 has a form of an axially split tube having a sectional form like a letter C and is disposed in the groove 1 with its longitudinal split facing to the groove side wall, so that the seal metal 2 supported thereon is permitted to effect a small displacement to the radial direction by the resilient yieldability of the buffer ring 5. The bottom side or inner face 2b of the seal metal 2 is formed with a slight taper so as to permit a minute displacement of the seal metal 2 in the direction of axis of the valve casing B under an action of hydrostatic pressure of the fluid.

When the butterfly valve is closed, as shown in FIG. 1, the higher internal pressure acting onto the valve body 2 in the direction of the arrow causes it to impress onto the seat metal 3. Here, the contact point between them coincides with the center (01) of the seat metal 1 and with the center (02) of the seal metal 1. When the inner hydrostatic pressure is increased, it acts on the buffer ring 5 so as to increase the internal pressure within the inside space thereof, resulting in a more tight sealing of the valve.

As explained above, the seal system according to the present invention offers an excellent seal effect that has not been attained in the conventional butterfly valves, by the arrangement of a separate seal metal capable of permitting small displacement in radial and axial directions to effect a spontaneous adjustment of the contact point. The resilient support strength of the buffer ring supporting the separate seal metal can, on requirement in accordance with the size of the butterfly valve, be supplemented by inserting in the inside space of the buffer ring a suitable resilient support aid 5a, such as steel plate etc.

What is claimed is:

1. A seal system for a butterfly valve comprising:
   a valve body;
   a groove disposed about the circumference of said valve body;
   a metal seal member disposed in said groove for radial displacement and having a curved outer face extending outwardly beyond said valve body circumference;
   a valve casing having an inner face directed toward said valve body;
   a metal seat stripe disposed on said casing inner face and extending inwardly to engage said metal seal member curved outer face, said stripe having an inner face inclined with respect to the axis of said valve casing; and,
   a buffer ring having an axially split C-shaped cross-sectional form disposed in said groove below said metal seal with said split facing inwardly, said buffer ring resiliently supporting said metal seal member against said metal seat stripe so as to effect a tight engagement therebetween with the interior of said buffer ring being exposed to the hydrostatic fluid pressure within said valve to thereby uniformly increase the force exerted by said buffer ring on said metal seal member in response to any increase in said hydrostatic fluid pressure.

* * * * *